UNITED STATES PATENT OFFICE.

MELCHIOR BÖNIGER, OF BASLE, SWITZERLAND, ASSIGNOR TO CHEMICAL WORKS, FORMERLY SANDOZ, OF SAME PLACE.

BLUEISH-RED AZO DYE.

SPECIFICATION forming part of Letters Patent No. 640,989, dated January 9, 1900.

Application filed November 21, 1899. Serial No. 737,777. (No specimens.)

*To all whom it may concern:*

Be it known that I, MELCHIOR BÖNIGER, doctor of philosophy, residing at Mittlerestrasse 137, Basle, Switzerland, have invented new and useful Improvements in the Manufacture of Azo Dyes Deriving from 1.8 Alphylsulfamidonaphtoldisulfonic acids, of which the following is a specification.

The present invention relates to the manufacture of new azo dyestuffs, dyeing wool and silk in an acid-bath bright shades varying from blue-red to violet. These new coloring-matters are produced by combining diazo bodies of suitable aromatic amido compounds with 1-8 alphylsulfamidonaphtoldisulfonic acids. These latter new azo components are formed by condensation of alphylsulfochlorids, as benzenesulfochlorid ortho- and para-toluenesulfochlorid, xylenesulfochlorids with 1.8 amidonaphtoldisulfonic acids. In order to obtain a quantitative sulfonation of the amido group in these amidonaphtolsulfonic acids, it is preferable at first to sulfonate also the hydroxylic group and then to split off by suitable means hereinafter specified the alphylsulfon radical combined with the hydroxylic group. The disulfonated products neither combine with diazo compounds nor can they be diazotized by treating them with nitrous acid. If their solution be boiled with alkali carbonates or caustic alkalies, the alphylsulfon radical combined with the hydroxylic group is removed, whereas the alphylsulfonated radical substituted in the amido group remains unchanged, and thus the disulfonated acids can be quantitatively transformed into monoalphylsulfamidonaphtoldisulfonic acids. The new most valuable azo components thus formed have all the characteristics of naphtolsulfonic acids, the amido group being completely paralyzed by the acid alphylsulfon radical substituted in it. For instance, whereas the amido group in the starting material is changed into the diazo group by the action of nitrous acid the alphylsulfonated amido group in the new products remains quite unaffected if treated with this reagent; but the new substances have retained the valuable property of the initial material to react very easily with suitable diazo bodies, producing thus very bright azo colors fast to acids, alkalies, and light. The tints produced by the corresponding azo combinations deriving from the unchanged 1.8 amidonaphtoldisulfonic acids are much duller and do not possess the same good evenness.

Besides the difference in the behavior against nitrous acid the 1.8 alphylsulfamidonaphtoldisulfonic acids are also much more soluble than the corresponding amidonaphtolsulfonic acids from which they are produced. They can only be precipitated from highly-concentrated solutions of their salts by addition of an excess of strong mineral acids.

Most of the usual diazo bodies combine only in alkaline solution with the new alphylsulfamido acids. As exceptions, may be mentioned nitrodiazobenzenes and dichlordiazobenzenes, which also react in mineral-acid solution; but also with these diazo bodies the same coloring-matters are always obtained, no matter if the combination be carried out in acid or in alkaline solution, the diazo radical being therefore always and alone directed by the hydroxylic group of the new alphylsulfamidonaphtoldisulfonic acids.

For the production of the new 1.8 alphylsulfamidonaphtoldisulfonic acids I may proceed, by way of example, as follows: Sixty kilos of 1.8 amidonaphtol 3.6 disulfonic acid (100 per cent. acid sodium salt) are dissolved at about 70° centigrade in six hundred liters of water by addition of sixty kilos of finely-powdered chalk. To this mixture eighty-eight kilos of paratoluenesulfochlorid are now slowly introduced during two hours, care being taken to maintain the temperature between 70° and 80° centigrade and to stir well during the whole process of condensation. If all the sulfochlorid be added, stirring is continued for about a further two hours at 80° centigrade until an acidulated sample taken out from the solution on addition of sodium nitrite shows no more any formation of a diazo compound. The solution is then heated to boiling, and to transform the ditolylsulfamidonaphtoldisulfonic acid formed in the first reaction into the monoparatolylsulfamidonaphtoldisulfonic acid—that is to say, to split off the alphylsulfamido radical combined with the hydroxylic group—a solution of fourteen or fifteen kilos of caustic soda is added, boiling being afterward continued during an hour. Care must be taken that the mass is still slightly alkaline on the end of the reaction. This small excess of the caustic alkali is then neutralized, preferably by muriatic acid, and after precipitation of the chalk by addition of thirty-five kilos of Solvay soda the solution is filtered and can now be directly used without any further purification for the production of coloring-matters.

In the foregoing example the paratoluenesulfochlorid can be substituted by corresponding quantities of other alphyl (aromatic) sulfochlorids, as benzene, orthotoluene, xylenesulfochlorids, and, on the other hand, instead of 1.8.3.6 amidonaphtoldisulfonic acid the isomeric 1.8.2.4 or 1.8.4.6 amidonaphtoldisulfonic acids may be used.

In the manufacture of azo dyes deriving from the new 1.8 alphylsulfamidonaphtoldisulfonic acids I may proceed as follows: The solution of the 1.8 paratolylsulfamidonaphtol 3.6 disulfonic acid described in the foregoing example is diluted with a solution of ten kilos of Solvay soda to about twelve hundred liters. After cooling with ice, preferably to about 5° centigrade, it is combined while stirring with the diazobenzene solution corresponding to fourteen kilos of anilin. The coloring-matter thus formed separates almost entirely in form of a crystalline-red precipitate, which after some hours standing may be filtered, pressed, and dried.

The new coloring-matter forms in a dry state a red powder soluble in alcohol, very easily soluble in water with blue-red color, which is scarcely altered by the addition of alkalies or acids. Strong sulfuric acid dissolves the dyestuff with a blue-red color. On diluting this solution with water no alteration takes place.

The coloring-matter dyes wool and silk from a slightly-acidulated bath in very clear and brilliant blue-red shades of excellent uniformity and fastness to acids, alkalies, and light.

Similar dyestuffs are obtained when in the foregoing examples the 1.8.3.6 alphylsulfamidonaphtoldisulfonic acid is substituted by the isomeric 1.8.2.4 or 1.8.4.6 alphylsulfamidonaphtoldisulfonic acids, and if in place of diazobenzene the equivalent weights of the diazo compounds of other amins their carbonic or sulfonic acids be used—as, for example, ortho- and para-toluidin, meta- and para-xylidin, mono- and di-cloranilins and their homologues, paraämidoacetanilid, meta- and para-nitranilin and their homologues, orthoanisidin, paraphenetidin, metaämidoparakresolether, anilinsulfonic acids and their homologues, amidobenzoic acids, amidoazobenzene, amidoazotoluene and their sulfonic acids, $\alpha$- and $\beta$-naphtylamin and their mono- and di-sulfonic acids.

The azo colors deriving from sulfo-conjugated amido compounds are generally of a greater solubility and must be precipitated from their solutions by addition of common salt or chlorid of potash. The different dyestuffs thus obtained dye shades varying from blue-red to bluish violet. The bluest shades are obtained by the combinations deriving from paraphenylenediamin and its homologues. Those coloring-matters can be produced either by combining diazotized para-amidoacetanilid or its homologues with the new alphylsulfamidonaphtolsulfonic acids and then saponifying in the usual manner the thus produced acetylamidoazo coloring-matters, or by coupling diazoparanitranilin or its homologues with the new alphylsulfamidonaphtolsulfonic acids and then reducing the nitro group in the thus obtained nitroazo dyestuffs, for instance, by means of alkali sulfids.

The whole series of dyestuffs deriving from the different 1.8 alphylsulfamidonaphtoldisulfonic acids show the same characteristic—e. g., they are completely destroyed by boiling them with zinc-dust, forming thereby a slightly greenish-yellow solution, which after acidulation on addition of an oxidizing agent, as ferichlorid or bichromate of potash, turns into an intense yellow.

Now what I claim, and desire to secure by Letters Patent, is the following:

The new azo dyes deriving from one molecule of a diazotized aromatic amido compound and one molecule of an 1.8 alphylsulfamidonaphtodisulfonic acid as hereinbefore described, forming red to dark powders easily soluble in water dissolving in alcohol and strong sulfuric acid with blue-red to violet color the said dyestuffs being destroyed by reduction with zinc-dust forming thereby a slightly greenish-yellow solution, which when acidulated on addition of an oxidizing agent turns into intense yellow.

In testimony whereof I have signed my name to this specification in the presence of two subscribing witnesses.

MELCHIOR BÖNIGER.

Witnesses:
 GEORGE GIFFORD,
 ARNOLD STEINER.